March 8, 1955 V. M. HAYWOOD 2,703,454
METHOD AND APPARATUS FOR CONSTRUCTING FAMILIES
OF CONFOCAL HYPERBOLAS AND THE LIKE
Filed July 10, 1951 2 Sheets-Sheet 1
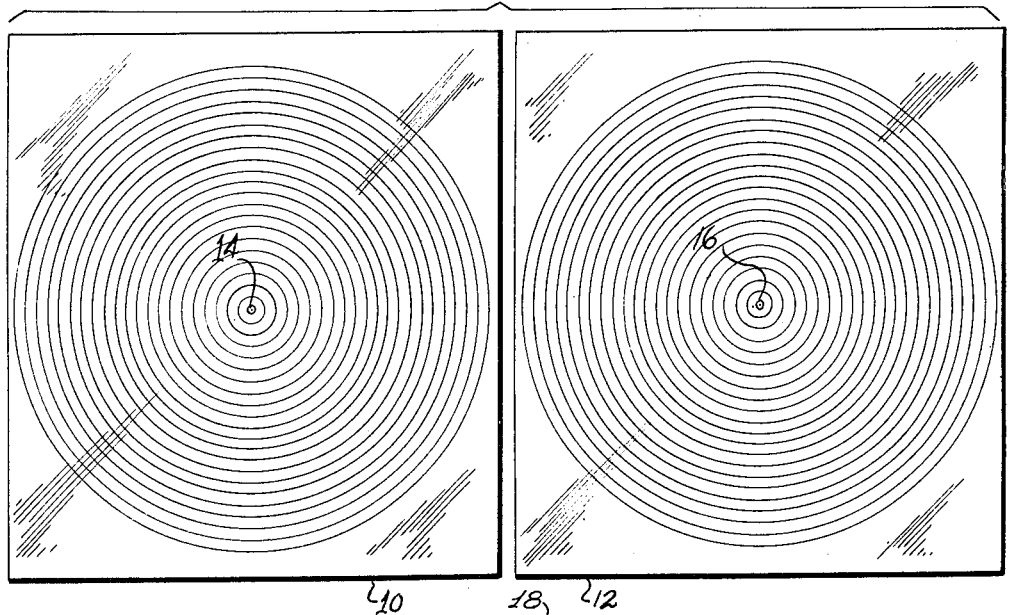
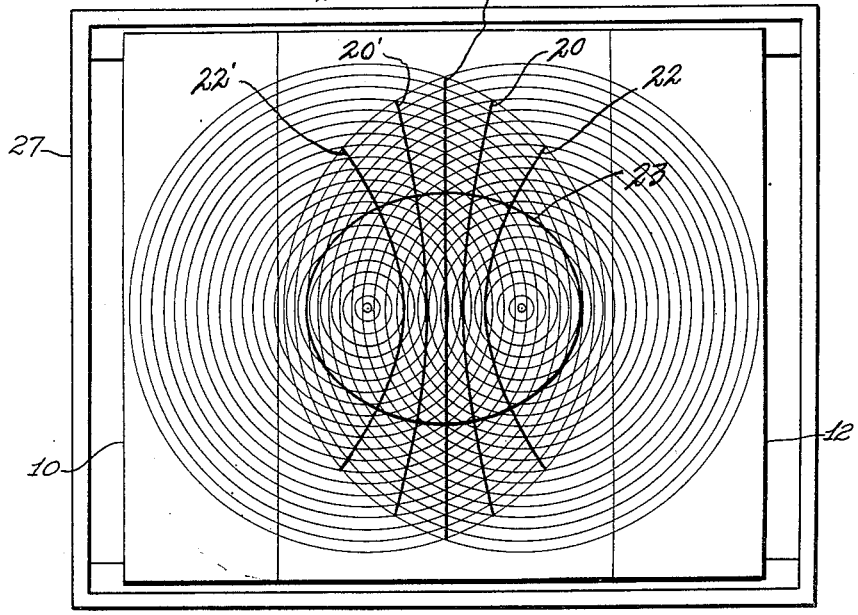
INVENTOR
VERNON M. HAYWOOD
BY Cushman, Darby & Cushman
ATTORNEY March 8, 1955 V. M. HAYWOOD 2,703,454
METHOD AND APPARATUS FOR CONSTRUCTING FAMILIES
OF CONFOCAL HYPERBOLAS AND THE LIKE
Filed July 10, 1951 2 Sheets-Sheet 2
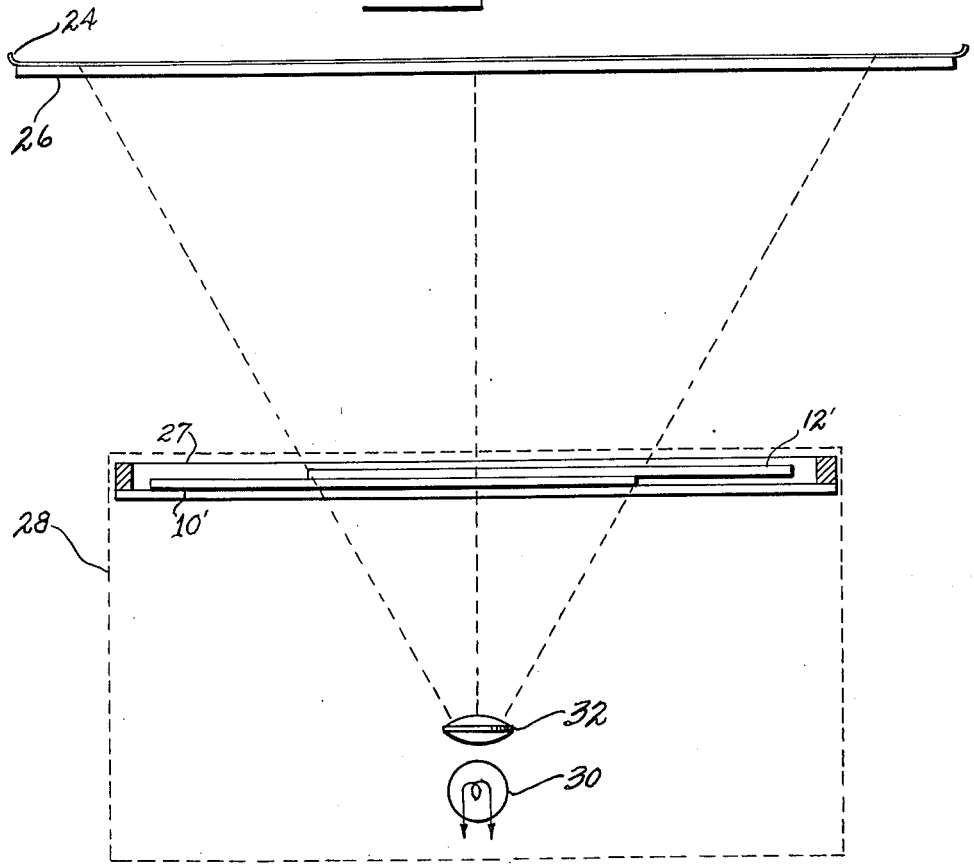
INVENTOR
Vernon M. Haywood.
BY Cushman, Darby & Cushman
ATTORNEY

United States Patent Office 2,703,454
Patented Mar. 8, 1955

2,703,454

METHOD AND APPARATUS FOR CONSTRUCTING FAMILIES OF CONFOCAL HYPERBOLAS AND THE LIKE

Vernon M. Haywood, Hampton, Va., assignor to Hastings Instrument Company, Inc., Hampton, Va., a corporation of Virginia Application July 10, 1951, Serial No. 235,947

9 Claims. (Cl. 33—1)

This invention relates to methods and apparatus for constructing families of confocal hyperbolas and the like particularly for use with radio navigation systems.

There are presently known a number of radio navigation systems in present use that give data in terms of hyperbolic or elliptical lines of position. For example, such systems are those termed "Raydist," "Decca," "Loran" and "Gee." In cases where permanent installations at fixed points are employed charts or overlays with hyperbolic or like lines can be made and reproduced in large quantities for use with the system. However, in other cases, the systems may consist of portable radio units which can be set up anywhere for such purposes as surveying or tracking. Accordingly, these systems will require a different set of charts for each navigation problem to be solved.

It will immediately be appreciated that a great deal of time and effort has been required to prepare charts for every such use of a portable or like system. There is therefore considerable need for methods and apparatus for rapidly constructing such charts or overlays.

It will be understood that while primary use of the invention may be with radio navigation systems, other uses will be apparent and are intended to be covered.

It is, therefore, a primary object of the present invention to provide method and apparatus for constructing on overlays, charts or the like families of confocal hyperbolas and ellipses.

It is a further object of the present invention to provide methods and apparatus for producing such charts, overlays and the like wherein enlargement techniques can be readily employed for adjusting the lines in accordance with map scale and radio wave-length or the like.

Further objects and the entire scope of the invention will become more fully apparent from the following detailed description and from the appended claims.

The invention may be best understood with reference to the accompanying drawings in which:

Figure 1 shows a plan view of two master plates each having thereon a set of concentric circles.

Figure 2 shows the master plates of Figure 1 in partially superimposed condition.

Figure 3 shows an edgewise section view of the master plates as arranged in Figure 2.

Figure 4 shows a diagrammatic representation of a photographic type enlargement arrangement employed in the invention.

Referring now to Figure 1, master plates 10 and 12 may be opaque and each have a family of concentric circles spaced equal distances apart about centers 14 and 16, respectively. In this case, the circles are transparent lines. However, the plates 10 and 12 may be transparent and the circles opaque lines. It will become apparent from the following description that the two cases are equivalents, although opaque plates and transparent lines may be preferable.

In practice the plates 10 and 12 may be photographic negatives so developed that the circles will be transparent, or the plates may be glass and the circles may be opaque painted lines or etched lines. Finely etched lines will provide an extremely accurate arrangement.

If the plates are now superimposed as shown in Figures 2 and 3 with plate 12 above plate 10 or vice-versa, and light directed toward one side of the assembly as by holding toward a window or providing an artificial light source, an observer on the opposite side will see the intersections of the circles. These intersections will be observed to designate a family of confocal hyperbolas when faired through at generally right angles to a base line extending through the centers 14 and 16. Moreover, a family of ellipses is found by fairing through at generally right angles to a perpendicular bisector of the base line. If the plates 10 and 12 are opaque with the circles as transparent lines, spots of light will appear at each of the intersections and hyperbolas and ellipses may be readily traced through such intersections. On the contrary, if the plates 10 and 12 are transparent and the lines opaque all of the lines will be observed as in Figure 2 except that the intersections can be followed with the eye.

By referring to equal spacing of the circles about centers 14 and 16 it will be understood that on each plate the radius of each circle increases the same amount over that of the next inner circle. Also, corresponding circles of each plate are of equal radius. As can be seen from Figure 2, if one traces through adjacent intersections in consecutive order of increasing (or decreasing) radius in both families of circles the resulting trace is a hyperbola, which if one traces through adjacent intersections in the order of increasing radius in one family of circles and decreasing radius in the other family, the resulting trace will be an ellipse.

Assuming either transparent or opaque plates, if the centers 14 and 16 are first made to coincide, there will be no intersections formed which designate the loci of the hyperbolas and ellipses. However, if the centers are now separated along a horizontal line as viewed in Figure 2, there will appear a first line of intersections, traced in Figure 2 as the line 18, when the centers 14 and 16 are spaced apart a distance substantially equal to the equal spacings of the circles on each of the master plates. As the separating movement of the plates continues, the line 18, which is perpendicular to the base line along which the centers are being separated, will remain stationary and midway between the centers 14 and 16. However, upon the separation of the centers 14 and 16 equal to and more than the spacing between the circles there will begin to appear additional lines of intersections such as those designated 20 and 22. The lines always appear in pairs wherein the second lines are designated as 20′ and 22′ in Figure 2. It will be understood that in Figure 2 with the spacing of centers 14 and 16 as illustrated, there are several additional hyperbolic lines which could be traced.

An example of ellipses which also may be traced is designated in Figure 2 by reference character 23.

The loci points may be transferred to a chart by photosensitizing the surface of the chart and employing well known photographic techniques. Similarly, as mentioned above, the plates may be placed underneath a chart and a strong light placed underneath the plates to make points of light visible on the upper surface of the chart for the chart-maker to fair in.

For use with radio navigation systems, the concentric circles may be spaced apart one-half wavelength of the radio carrier frequency, or some multiple or fraction thereof, and the centers 14 and 16 placed directly over the radio unit positions as located on a map for convenience in directly indicating points of 180° phase difference of the radio carrier waves. In general, the spacings of the concentric circles on the two master plates would be determined by the scale of the map or chart on which the hyperbolas or ellipses are to be traced as well as the frequency employed in the system.

As illustrated in Figure 4, the spacings between the concentric circles on each master plate can be effectively varied by use of a single set of master plates here designated 10′ and 12′ by fixing the plates in a photographic enlargement apparatus. The chart or other member on which the hyperbolas are to be formed and here designated as 24 may be supported on a table 26 formed of transparent material such as glass. The master plates 10′ and 12′ would then be mounted in a retaining frame 27 within a unit designated 28 which would also carry a light source 30 and lens system 32. The arrangement would be such, according to conventional photographic techniques, that the unit 28 and/or the plates 10′ and 12' and the lens system 32 would be adjustable as to distance and focus to the member 24 on table 26. Accordingly, irrespective of the physical spacing of the circles on plates 10' and 12', the spacing or corresponding image lines at table 26 could be readily adjusted. In this manner, almost any type of overlay can be prepared using a single set of carefully prepared master plates.

It is intended to be understood that the above detail description has been given only for purposes of illustration, and the true scope of the invention is to be determined from the appended claims.

I claim:

1. In the forming of hyperbolas and ellipses, the method comprising the steps of superimposing two master plates each having a family of equally spaced concentric circles so that the centers are separated a predetermined distance, the circles of both families being equally spaced, and recording only the intersections of the superimposed circles.

2. In the forming of hyperbolas and ellipses, the method comprising the steps of superimposing two master plates each having a family of equally spaced concentric circles so that the centers are separated a predetermined distance, the circles of both families being equally spaced, and tracing through selected adjacent intersections of the superimposed circles, the selection of circle intersections being in consecutive order of increasing (or decreasing) radius in both families of curves to form hyperbolas and of increasing radius in one family and decreasing radius in the other family to form ellipses.

3. In the forming of hyperbolas and ellipses, the method comprising the steps of superimposing two master plates each having a family of equally spaced concentric circles so that the centers are separated a predetermined distance, the circles of both families being equally spaced, and photographically reproducing only the intersections of the superimposed circles.

4. The method of forming confocal hyperbolas and ellipses comprising the steps of superimposing two master plates each at least partially transparent and each having a family of equally spaced concentric circles so that the centers are separated a predetermined distance, the circles of both families being equally spaced, projecting light through the superimposed plates to form an enlarged image of the intersecting lines, and recording only the intersections.

5. The method of forming confocal hyperbolas and ellipses comprising the steps of superimposing two master plates each at least partially transparent and each having a family of equally spaced concentric circles so that the centers are separated a predetermined distance, the circles of both families being equally spaced, projecting light through the superimposed plates to form an enlarged image of the intersecting lines, and tracing through selected adjacent intersections of the superimposed circles, the selection of circle intersections being in consecutive order of increasing (or decreasing) radius in both families of curves to form hyperbolas and of increasing radius in one family and decreasing radius in the other family to form ellipses.

6. The method of forming confocal hyperbolas and ellipses comprising the steps of superimposing two master plates each at least partially transparent and each having a family of equally spaced concentric circles so that the centers are separated a predetermined distance, the circles of both families being equally spaced, projecting light through the superimposed plates to form an enlarged image of the intersecting lines, and photographically reproducing only the intersections.

7. Apparatus for forming families of confocal hyperbolas and ellipses comprising, first and second opaque master plates each having a family of transparent concentric circles thereon, means for positioning the plates in overlaid position with the centers of the families of circles spaced apart, means for positioning a photo-sensitive member to one side of the plates, and means for positioning a light source on the opposite side of the plates whereby images only of the intersections of the circles may be transferred to the photo-sensitive member for providing loci of the hyperbolas and ellipses.

8. Apparatus as in claim 7 wherein the photo-sensitive member is at a predetermined position to the one side of the superimposed plates and the light source is positioned at a predetermined location to the other side of the plates as to permit predetermined enlargement of the image intersections.

9. Apparatus for use in forming families of confocal hyperbolas and ellipses for use with navigation systems using radio units operating at a predetermined frequency comprising, first and second opaque master plates each having a family of equally spaced transparent concentric circles, the circle spacing being equal to one-half of the wavelength of the predetermined frequency, and means for retaining the plates in superimposed position with the centers of the families of circles spaced apart, whereby the images intersecting may be viewed and recorded.

References Cited in the file of this patent
UNITED STATES PATENTS

| | | |
|---|---|---|
| 2,016,346 | Smith | Oct. 8, 1935 |
| 2,027,368 | Bockius | Jan. 14, 1936 |
| 2,293,416 | Terpening | Aug. 18, 1942 |
| 2,357,617 | Subkow et al. | Sept. 5, 1944 |
| 2,448,568 | Zwillinger et al. | Sept. 7, 1948 |
| 2,477,651 | Ranger | Aug. 2, 1949 |
| 2,569,498 | Schlatter | Oct. 2, 1951 |